United States Patent [19]
Weber

[11] 3,722,289
[45] Mar. 27, 1973

[54] DETECTOR OF DYNAMIC GRAVITATIONAL FORCE GRADIENT FIELDS

[75] Inventor: Joseph Weber, Chevy Chase, Md.

[73] Assignee: Hughes Aircraft Company, Culver City, Calif.

[22] Filed: Sept. 28, 1964

[21] Appl. No.: 399,632

[52] U.S. Cl. .................................................. 73/382
[51] Int. Cl. ............................................... B21d 5/02
[58] Field of Search ............................. 73/382, 505

[56] References Cited

UNITED STATES PATENTS

| | | | |
|---|---|---|---|
| 2,712,753 | 7/1955 | Campbell | 73/67.2 |
| 3,044,290 | 7/1962 | Rawding | 73/67.2 |
| 3,273,397 | 9/1966 | Forward | 73/382 |
| 3,353,400 | 11/1967 | Schafft | 73/24 |
| 3,091,708 | 5/1963 | Harris | 310/8.2 |
| 3,253,471 | 5/1966 | Maillard | 73/505 |

OTHER PUBLICATIONS

An Article Entitled "Detection and Generation of Gravitational Waves" by J. Weber in Physical Review, Vol. 117, No. 1, Jan. 1, 1960, pp. 306–313

*Primary Examiner*—James J. Gill
*Attorney*—James K. Haskell and Earnest F. Oberheim

[57] ABSTRACT

This is an instrument which detects dynamic gravitational force gradient fields and utilizes a body of elastic material with distributed mass including a dynamic mass quadrupole moment responsive to a dynamic gravitational force gradient having a characteristic frequency. The elastic body has a relatively high $Q$ mechanical vibrational resonant mode excited by relative accelerations between portions of the distributed mass caused in the mass quadrupole by the force gradient. An output signal is provided by electrical output means coupled with the vibrational resonant mode to form a relatively high $Q$ electromechanical circuit resonant at the characteristic frequency of the force gradient to be detected.

5 Claims, 11 Drawing Figures

INVENTOR

JOSEPH WEBER

BY J. K. Haskell

ATTORNEY.

INVENTOR

JOSEPH WEBER,

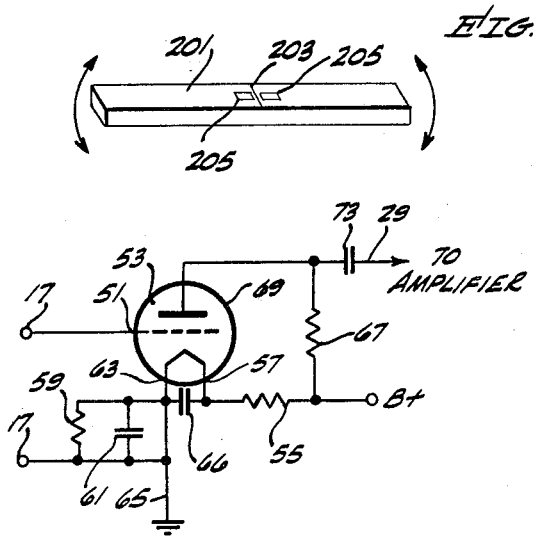
FIG. 8.
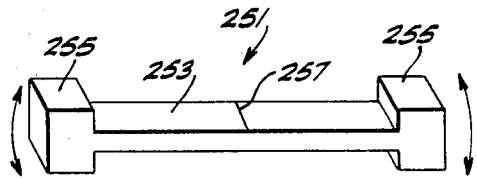
FIG. 9.
FIG. 4.
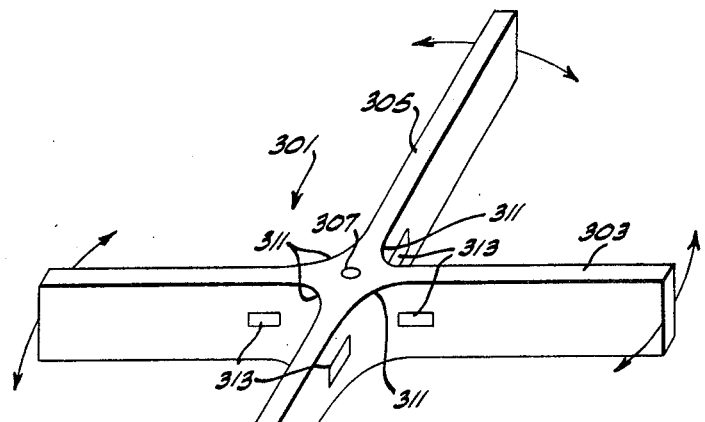
FIG. 10.
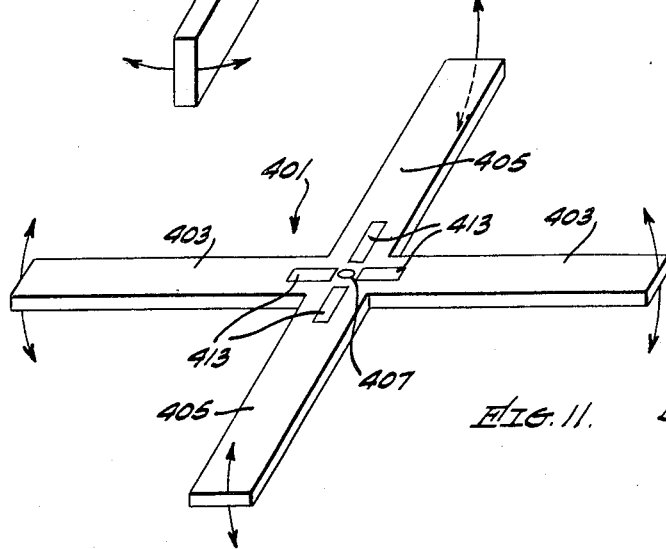
FIG. 11.
INVENTOR
JOSEPH WEBER,
BY J. H. Haskell
ATTORNEY.

INVENTOR

JOSEPH WEBER,
BY J. K. Haskell
ATTORNEY.

DETECTOR OF DYNAMIC GRAVITATIONAL FORCE GRADIENT FIELDS

This invention relates to gravitational field measurements and particularly to an instrument for the detection and measurement of dynamic gravitational force gradient fields.

Such dynamic gravitational force gradient fields can arise in many ways. One example is the time varying portion of the Newtonian gravitational force gradient field of an oscillating or rotating asymmetric mass. Another example is the gravitational radiation described by the Einstein theory of gravity (General Theory of Relativity) that is emitted by an accelerated mass quadrupole. Still another example is the effective dynamic gravitational force gradient field that is created by the relative motion of the detecting instrument through the static gravitational force gradient field of a mass.

The measurement of dynamic gravitational force gradients is of importance in technological and scientific areas. It is of great importance to technology to have an instrument that will measure the Newtonian gravitational force gradient fields existing around large ore bodies and oil-containing formations while being operated on a moving platform. It is also of great scientific importance to study the gravitational radiation emitted by astronomical sources such as rotating binary stars and exploding stars and galaxies to determine the inner structure of these bodies, their dynamic behavior and the radiation generation mechanisms. It is of further scientific importance to study the dynamic gravitational fields surrounding an oscillating or rotating asymmetric mass to investigate the validity of Newton's law of gravity in the high frequency region.

Prior to the devices described in the present invention, there did exist devices for the measurement of the anomalies created by geological formations. One instrument presently in use for measuring static gravitational gradients is the Eotvos torsion balance which employs two equal weights at different heights connected by a horizontal beam and suspended by a torsion wire so that it is free to rotate in a horizontal plane about the wire. The beam rotates only when a differential horizontal force acts on the weights, and this occurs when the gravitational field is distorted so that the horizontal component at one end is different from that at the other. A number of measurements are taken with the beam at different azimuthal orientations and the results are employed in equations which, when solved, provide a plurality of quantities which define the gradient and curvature. The torsion balance has only limited usefulness due to the length of time required to make measurements. This long measurement time is related to the inability to separate the desired gravitational response due to the geological formation of interest from the noise sources arising from the operation of the balance and from the inherent noise of the instrument itself. The use of an instrument with dynamic response characteristics operated in a manner which creates a dynamic interaction between the instrument and the gravitational field of the geological formations will create a dynamic instrument response with frequency characteristics that allow the desired signal to be separated from the noise by frequency filtering techniques.

However, there did not exist in the prior art any adequate method for measurement of the dynamic gravitational force gradient fields created by sources of interest to the scientific community. There do exist devices for the measurement of the dynamic force fields created by the Newtonian gravitational attraction of rotating or oscillating asymmetric masses. A survey of such work has recently published by J. C. Cook, "On Measuring the Phase Velocity of an Oscillating Gravitational Field," J. Franklin Inst., 273, pp. 453–471, (June 1962). Such devices usually take the form of an oscillatory pendulum (see J. C. Cook, Fig. 2). These pendulum devices are force measuring devices and as such are not only sensitive to the Newtonian gravitational force, but are also sensitive to the inertial forces caused by rotations and vibrations. The field of interest in scientific work is the gradient of the dynamic gravitational force field. The gravitational radiation emitted by astronomical sources is of a force gradient or tensor type (rather than of a force or vector type as is electromagnetic radiation) and therefore requires an instrument that responds to dynamic gravitational force gradients. The dynamic Newtonian gravitational fields surrounding an oscillatory or rotating asymmetric mass contain both force fields and force gradient fields, but the only part that can be unambiguously assigned to gravitational effects is the dynamic force gradient, and therefore an instrument that responds only to the force gradient and does not respond to the force itself is required in order to separate the desired gravitational signal from the inertial noises.

Accordingly, it is an object of the present invention to provide an instrument for the detection of geological formations from a moving platform.

It is another object of this invention to provide an instrument for the detection of dynamic gravitational force gradient fields.

Yet another object of the invention is to provide an instrument for the detection of gravitational radiation.

Still another object of the present invention is to provide an instrument for the measurement of the dynamic gravitational fields surrounding an oscillating or rotating asymmetric mass.

These and other objectives are achieved by a detector of dynamic gravitational force gradient fields according to the invention comprising a body of elastic material with distributed mass including a mass quadrupole moment responsive to a dynamic gravitational force gradient having a characteristic frequency. The body of elastic material has a mechanical vibrational resonant mode of relatively high Q and the mass quadrupole response takes the form of relative accelerations between portions of the distributed mass. Coupled to the body of elastic material is an electrical output means which in conjunction with the aforementioned vibrational resonant mode includes a relatively high Q electromechanical circuit which is resonant at a selected frequency corresponding to the characteristic frequency of the dynamic gravitational force gradient. The electrical output means provides an output signal which is indicative of the magnitude and phase of the dynamic gravitational force gradient.

The invention and specific embodiments thereof will be described hereinafter by way of example and with reference to the accompanying drawings, in which:

FIG. 4 is a schematic diagram of an electrometer tube preamplifier circuit shown in FIG. 1;

FIGS. 8, 9, 10 and 11 are perspective views of sensing elements according to further embodiments of the invention.

The detection of dynamic gravitational force gradient fields is accomplished in accordance with the present invention by following the concept that any body of elastic material with distributed mass having relatively high Q mechanical vibrational resonant modes will react as a sensing element to a dynamic gravitational force gradient field if the frequency of the gravitational field is the same as the frequency of one of the vibrational modes and the orientation of the vibrational mode and the gravitational field is properly chosen.

The acoustic vibrations set up by the dynamic gravitational force gradient field are no different than those set up by any other differential force and the methods of studying the vibrations are well known in the field of acoustics.

To obtain the maximum coupling between the gravitational field and the vibrational mode, the system should have low internal losses (or high mechanical Q) and low external losses such as coupling of the material to the surrounding air and supports.

Furthermore, any vibrating system alternates between storage of the vibrating energy in a kinetic form and a potential form. The kinetic energy takes the form of motion, either longitudinal, transverse or torsional. This motion occurs naturally at the free points in the vibrating system. The potential energy takes the form of compression, tension or shear of the material. These strains occur naturally at the nodes of the vibrating system. Since there is no motion of the vibrating system at a node, this is a preferred position to support the material. Also, it has been found that it is easier to detect the vibrations of the vibrating system by looking for the strains at the nodes rather than the more common and obvious method of looking for the motions at the antinodes. However, it may in certain instances be advantageous to couple to the motions at the antinodes. This may be accomplished by the conventional use of capacitive, inductive and magnetostrictive devices.

To detect these strains, strain transducers (which do not detect motion directly) may be attached at the nodes where the strains are a maximum. Piezoelectric crystals have been found to be satisfactory strain transducers. By proper design and choice of crystal type, crystal orientation and electrical connections, the strain energy is converted into electrical energy by means of these transducers. These techniques are well known in the field of acoustics and can be found in references such as "Piezoelectric Crystals and Their Application to Ultrasonics" by Warren P. Mason, D. Van Nostrand Co., Princeton, New Jersey (1959).

Figure 1:
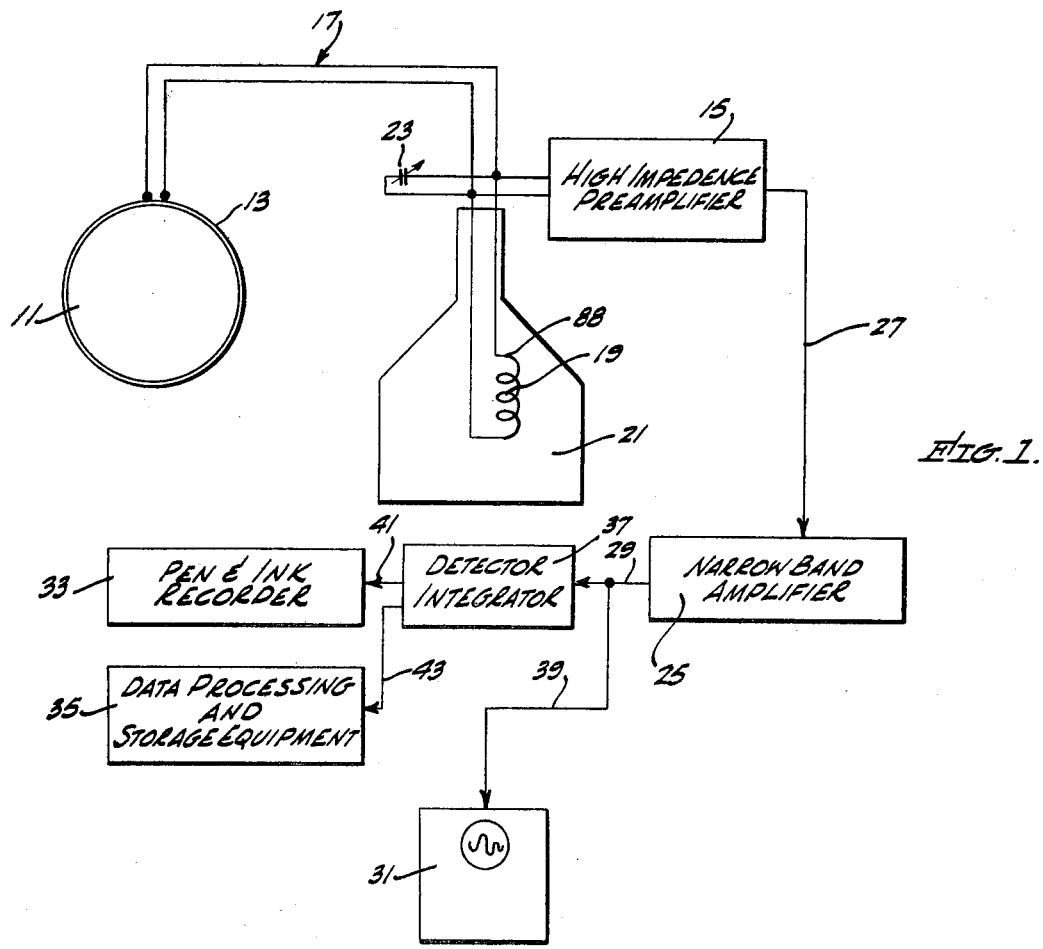
FIG. 1 is a schematic diagram of an embodiment of a dynamic gravitational force gradient field detector constructed according to the invention.

The exemplary embodiment of a dynamic gravitational force gradient field detector shown in FIG. 1 illustrate the application of the above-described concepts. An aluminum cylinder 11 is provided with a plurality of piezoelectric strain transducers 13 (see FIG. 2) which develop alternating electrical signals corresponding to the strains present in the cylinder 11. The signals are coupled to a low noise preamplifier 15 by means of leads 17 connected in parallel with a superconducting coil 19 immersed in a liquid helium filled Dewar 21 and shunted by an air dielectric tuning capacitor 23 supported just outside the Dewar 21. The signal is further amplified by a narrow band - high gain amplifier 25 coupled to the preamplifier 15 by cable 27. The amplified signal is then provided from cable 29 to various conventional display devices such as the oscilloscope 31 for ac presentations and/or to a pen and ink recorder 33 and data processing and storage equipment 35 through a detector-integrator 37 by means of cables 39, 41 and 43, respectively.

Figure 2:
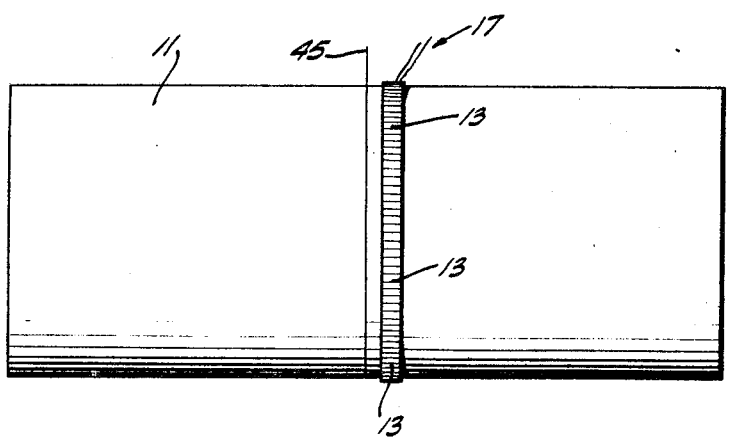
FIG. 2 is a side view of one embodiment of a sensing element used in the detector of FIG. 1.

The aluminum cylinder 11, as shown in FIG. 2, represents a body of elastic material with distributed mass including a mass quadrupole and is supported in the middle by a loop of wire 45. Because of its low cost, ease of fabrication and high intrinsic Q, 6061 aluminum was used as the cylinder 11 and operated in the first longitudinal vibrational mode. The cylinder 11 was chosen to be 5 feet long and 2 feet in diameter with a first longitudinal mode frequency of 1,657 cps and with a shallow groove (not shown) for the wire 45. In order to prevent the lowering of the interaction with the gravitational fields because of coupling of the cylinder 11 to the air, the cylinder 11 is placed in a conventional vacuum chamber which is not illustrated for the sake of clarity. The chamber is maintained at a noncritical vacuum value of 500 microns or better.

To detect the strains produced within the cylinder 11 by reaction with a dynamic gravitational force gradient field, the piezoelectric strain transducers 13 are attached to the cylinder 11 at the nodes where the strains are a maximum. For the first longitudinal mode, this node occurs at the middle of the cylinder 11. The cylinder 11 is supported by the loop of wire 45 at this nodal line. Since there is a minimum amount of motion at the nodal line, there will be a minimum amount of interaction with the supporting loop of wire 45 and this will minimize the nonlinear or dissipative interactions that lower the Q. The odd higher order longitudinal modes also have a node at the middle of the cylinder 11 so that by changing the frequency of the external electronics to include or match the frequency of these odd higher harmonics the cylinder 11 can be used to detect dynamic gravitational force gradients at these other frequencies. The even order harmonics have an antinode at the middle position so therefore their measured Q is substantially less than the odd order harmonics. If it is desired to operate at an even harmonic, two or more supporting loops of wire would have to be used and placed at the nodal points whose position would vary with the particular even harmonic.

Figure 3:
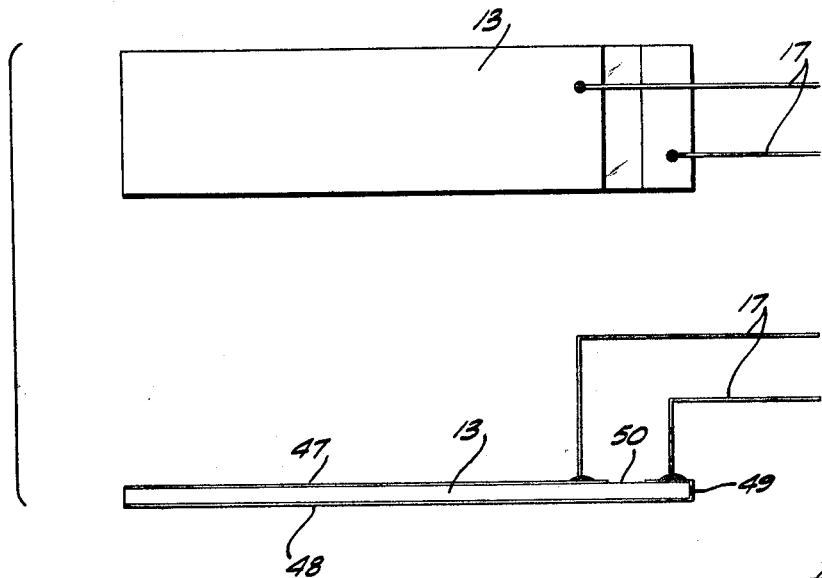
FIG. 3 is a top and side view of a piezoelectric strain transducer which was used in the detector constructed as shown in FIG. 1.

The transducers 13 are more clearly illustrated in FIG. 3. They are fabricated from X-cut quartz and are approximately one-quarter inch wide, 2 inches long and 0.080 inches thick. The top and bottom portions are first plated with a very thin chromium base coat to wet the crystal and then silver coatings 47 and 48, respectively, 0.0002 inches thick are used to act as terminals for the voltage developed by the quartz and as a means for connecting the leads 17 to the rest of the circuit. As shown in FIG. 3, the plating 48 on the bottom portion extends around end portion 49 of the transducer 13 to facilitate lead connection leaving a gap portion 50 to prevent an electrical short circuit. The frequency of the voltage so developed by the transducer 13 will vary somewhat but will be centered around the resonant frequency of the vibrating system (cylinder 11). In order that the electric output circuit (which includes among others the transducer 13, the superconducting coil 19 and the input impedance of the preamplifier 15) and the mechanical vibrational resonant circuit of the cylinder 11 effectively combine to form an electromechanical circuit with a single relatively high Q resonance, it is necessary to use a sufficiently large number of transducers to provide a strong coupling. For the particular embodiment constructed and shown in FIG. 1 and 2, 300 such transducers were used, although a somewhat lesser number may provide good results.

The piezoelectric transducers 13, because of their construction, will have a capacitive reactance associated with them. It is necessary for optimum signal-to-noise ratio to tune out the reactance. This is accomplished by shunting the parallel connected transducers 13 with an inductance. In this case, the inductance takes the form of the 1 Henry coil 19. The value of inductance of the coil 19 is chosen so that the entire circuit, which includes the capacitance of the transducers 13, the stray capacitance and inductance of the interconnecting wires 17, the coil 19, the tuning capacitance 23 and the input impedance of the following preamplifier stage 15, is resonant at the same frequency as the vibrating system, i.e., 1,657 cps. This was easily accomplished by the insertion of the small air dielectric capacitor 23 in parallel with the coil 19 and tuned for a maximum output to the following stage when the cylinder 11 was mechanically excited by a very strong driving force applied to the supporting structure (i.e., hitting the vacuum chamber with a large hammer). The coil 19 consists of approximately 12,000 turns of 3 mil double coated Niobium wire wound on a hollow quartz coil form (not shown) which is 3 inches long and 2 inches in diameter. In order to reduce unwanted Johnson noise (to be discussed later), the coil 23 is made superconducting by its immersion in the liquid helium bath contained in the 25 liter Dewar 21.

To prevent heavy loading of the tuned circuit, the preamplifier 15 should have a very high input impedance of the order of 100 megohms and more. Also, the preamplifier 15 should have a low noise figure to prevent the masking of the weak signal. The combination of a high input impedance and a low noise figure with a very high input impedance is obtainable, for example, by the use of an electrometer tube circuit such as the one shown in FIG. 4. Here, the leads 17 couple the input signal developed by the transducers 13 to the grid electrode 51 of electrometer tube 53. Proper filament voltage and operating bias are provided by a dropping resistor 55 connected between a 42 volt source (not shown) of B+ voltage and filament terminal 57, and a parallel resistor 59-capacitor 61 combination connected between the other filament terminal 63 and a common ground return 65. A filament bypass capacitor 66 is connected between the filament terminals 57 and 63. The plate load resistors 67 connects B+ to an anode terminal 69 of the tube 53. The input signal is amplified by the amplifier 15 by a factor of approximately 2, the amplified output signal of which is coupled to the narrow band amplifier 25 by capacitor 73 and the cable 29. The value for the various components of the preamplifier 15 is given in the following table:

| | |
|---|---|
| 53 | Type 5886 electrometer tube |
| 55 | 3,750 ohm 1/2 watt carbon resistor |
| 59 | 300 ohm 1/2 watt carbon resistor |
| 61 | 20 $\mu$f 50 volt capacitor |
| 66 | 50 $\mu$f 10 volt capacitor |
| 67 | 150,000 ohm 1 watt carbon resistor |
| 73 | 0.1 $\mu$f capacitor |

The preamplifier 15 may be immersed in the liquid helium bath in the Dewar 21 to help reduce noise even more. The electrometer tube circuit has been operated at liquid helium temperatures (4.2° K) with very satisfactory results.

The signal from the preamplifier 15 is amplified by the high gain (approximately 10,000), tuned amplifier 25 which has a center frequency of 1,657 cps. Amplifiers capable of this type operation are well known in the art use tuned RC feedback networks at each amplifying stage to narrow the bandpass to reduce the effects of wide band noise. Also, twin-tee networks are used to reject 60 cps hum. A Strandberg type amplifier may be used. Such an amplifier is described in a paper entitled "Recording Magnetic-resonance Spectrometer," by M.W.P. Strandberg, et al., in the Review of Scientific Instruments, 27, August 1956, p. 604, Figure 7, with the RC constants in the feedback networks chosen to resonate at 1,657 cps.

The signal developed by the transducers 13 will not be very large in magnitude and it is thus advisable to consider the electrical and mechanical sources of noise that could possible mask the desired signal.

Noise can originate in the vibrating system in two ways. By (1) thermal fluctuations and by (2) mechanical couplings. The vibrating system is designed so that the mechanical coupling of the important vibrational mode to the other mechanical parts of the vibrating system is eliminated or minimized. This is a matter of good design that will depend upon the particular vibrating system. The techniques of isolating degrees of freedom of mechanical systems are well know, the basic principle being that all necessary support forces should be applied at nodal points and that the materials used be strong enough so that the strains remain linear (Hookes Law remains valid). If nonlinear strains are allowed to develop, then undesired coupling into the vibrational mode becomes more probable.

To eliminate the coupling of the external acoustic noise sources to the vibrating system through the supports, it is sufficient to design the supports and the electrical leads so that they act as an acoustic filter to prevent acoustic vibrations from reaching the vibrating system. These techniques are well known in acoustic engineering. For connections under tension (the leads 17, for example), the necessary impedance mismatches are created by adding masses such as lead blocks (not shown) at proper points. The areas with increased mass will have a different acoustic impedance than the neighboring areas and the acoustic vibrations will be reflected back away from the vibrating system.

Figure 5:
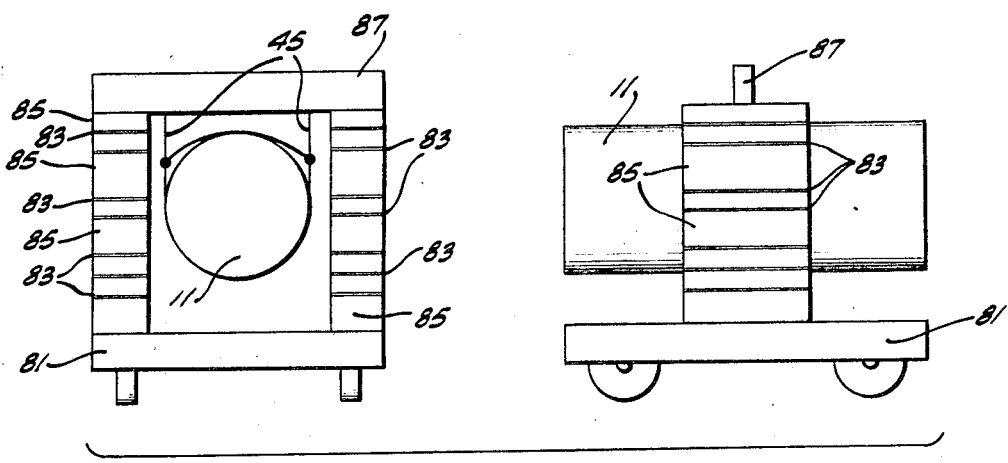
FIG. 5 is a side and end view of the sensing element of FIG. 2 supported on a movable platform for convenient transportation in and out of a vacuum chamber.

For connections under compression, the necessary impedance mismatches are created by constructing the connections of alternating layers of materials with different acoustic impedances such as metal and rubber. For example, FIG. 5 illustrates an exemplary manner of supporting the cylinder 11 on a movable vehicle 81. Here, ¼ inch rubber pads 83 separate blocks of steel 85 of various dimensions to support a cross beam 87 to which wire 45 is attached. The acoustic vibrations will be reflected at the interfaces of the two differing materials and will be kept away from the vibrating system. The design of the filter is strongly dependent upon the primary function of the connector and the frequency of the vibrating system. But, these are common problems in acoustic engineering and the solution is straight-forward once the the form of the device is decided upon.

Noise can also originate in the electronic circuitry. The common sources are nonlinear effects in the materials used in the circuitry and the Johnson noise given off by any resistance in the circuitry. To minimize the effect of this noise, the coil 19 is preferably in a superconducting state. This not only eliminates a major source of noise but also increases the Q of the circuit. The coil 19 may also be encased in a lead can (not shown) which is in a superconducting state and electrically connected to a common ground side 88 (FIG. 1) of the coil 19 to form an electromagnetic shield. This will even further reduce the noise.

Still another source of noise is the preamplifier stage due to the resistive component of the input impedance which creates Johnson noise, and to the random emission of electrons in the tube which causes shot noise. To decrease the noise due to the input resistance, an amplifier having an input resistance which is larger than the parallel resistance of the electronic circuitry may be used. To minimize the shot noise, it may be desirable to use an amplifier having a good noise figure. In the detector constructed according to the invention, it was found that a simple electrometer tube circuit such as shown in FIG. 4 was quite satisfactory for this service.

In order to understand the method of operation of the devices of the present invention and to demonstrate that the interactions observed are due to coupling of the devices to dynamic gravitational fields rather than some other interaction, a brief outline of the theory of dynamic gravitational interactions is here presented.

A dynamic gravitational field is defined as the time varying component of the gravitational interaction between two structures which are in relative motion. This is usually understood to mean that one of the bodies is undergoing oscillatory or translational motion in inertial space and therefore its gravitational field varies with time. This time varying gravitational field will then exert time varying forces on a detecting device.

There is also another possible method for a dynamic gravitational interaction in which the source body is stationary with respect to inertial space, and its gravitational field does not vary with time, but only with position. If the detecting device is moving with respect to inertial space, then the spatially varying gravitational field of the source is transformed, in the detecting body's frame of reference, into a time varying gravitational field.

Mechanically, the two are nearly equivalent although the second type of dynamic gravitational interaction is usually more practical.

It shall be assumed that all gravitational effects are correctly described by Einstein's theory of gravity (General Theory of Relativity). (See for example A. Einstein, *The Meaning of Relativity*, 5th Edition, Princeton University Press, Princeton, New Jersey (1955); C. Moller, *The Theory of Relativity*, Oxford University Press, London (1957); or J. Weber, *General Relativity and Gravitational Waves*, Interscience Publications, Inc., New York (1961).) It shall also be assumed that the cosmological constant, sometimes included in the theory, is too small to be of interest in experimental work so that the field equations of general relativity will be assumed to have the form:

$$R_{\alpha\beta} - \tfrac{1}{2} g_{\alpha\beta} R = [(8\pi G)/c^4] T_{\alpha\beta} \qquad (1)$$

where $c = 3.00 \times 10^8$ m/sec is the speed of light, $G = 6.67 \times 10^{-11}$ m$^3$/kg sec$^2$ is the Newtonian constant of gravity $T_{\alpha\beta}$ is the stress-energy-momentum tensor $g_{\alpha\beta}$ is the metric tensor describing the properties of gravitation and space which is defined by the square of the "$\nu$ interval" $ds$ along the space-time world line $s$ $$-ds^2 = g_{\alpha\beta}\, dx^\alpha dx^\beta \qquad (2)$$

with the signature chosen so that the flat space metric has the form:

$$g_{\alpha\beta} \approx \delta_{\alpha\beta} = \begin{vmatrix} -1 & 0 & 0 & 0 \\ 0 & +1 & 0 & 0 \\ 0 & 0 & +1 & 0 \\ 0 & 0 & 0 & +1 \end{vmatrix} \qquad (3)$$

$R$ is the curvature scalar obtained from the contraction of the Ricci tensor.

$$R = g^{\alpha\beta} R_{\alpha\beta} = R^\alpha_\alpha \qquad (4)$$

and $R_{\alpha\beta}$ is the Ricci tensor obtained from the contraction of the Riemann Tensor.

$$R_{\alpha\beta} = R^{\gamma}_{\alpha\gamma\beta} \quad (5)$$

The Riemann tensor or curvature tensor is defined in terms of the Christoffel symbols as:

$$R^{\mu}_{\alpha\beta\gamma} = \Gamma^{\mu}_{\alpha\gamma,\beta} - \Gamma^{\mu}_{\alpha\beta,\gamma} + \Gamma^{\mu}_{\delta\beta}\Gamma^{\delta}_{\alpha\gamma} - \Gamma^{\mu}_{\delta\gamma}\Gamma^{\delta}_{\alpha\beta} \quad (6)$$

and the Christoffel symbols are defined in terms of the metric tensor $$\Gamma^{\gamma}_{\mu\alpha} = \frac{1}{2} g^{\gamma\delta} [g_{\delta\mu,\alpha} + g_{\delta\alpha,\mu} - g_{\mu\alpha,\delta}] \quad (7)$$

It is assumed that the reader is familiar with tensor notation and the usual conventions such as automatic summation over repeated indices.

The Christoffel symbol defined in (7) is seen to be a convenient mathematical notation for a sum of products of the metric tensor and its first derivatives. Since the Riemann tensor (6) is defined in terms of sums and products of the Christoffel symbol and its first derivatives, it is seen to be a convenient notation for a complicated combination of sums and products of the metric tensor and its first and second derivatives. Since the Ricci tensor (5) and the curvature scalar (4) are sums of the products of the metric tensor and the Riemann tensor, this means that the left hand sides of the field equations (1) comprise a very complicated, nonlinear, second order partial differential prescription for the calculation of the components of the metric tensor, given the distribution and behavior of matter and energy in the form of the stress-energy-momentum tensor on the right hand sides.

The usual process of calculating the dynamical behavior of a system under the influence of gravitational and other forces is quite complicated. First, all the mass and energy in both the system being investigated and in the sources of the dynamic fields must be determined. Then, using these in a prescribed manner, the 10 components of the stress-energy-momentum tensor are calculated. Next, using the stress-energy-momentum tensor as the source term in the field equations (1), these ten nonlinear differential equations for the ten components of the metric tensor are solved. Then the metric tensor is used in the generalized equations of motion $$\frac{d^2x^{\mu}}{ds^2} + \Gamma^{\mu}_{\alpha\beta} \frac{dx^{\alpha}}{ds} \frac{dx^{\beta}}{ds} = \frac{F^{\mu}}{mc^2} \quad (8)$$

to determine how the system behaves.

For experimental purposes, it is not necessary to use the full field equations. The gravitational forces available are nearly always weak enough so that the nonlinear terms in the field equations are negligible. Often the velocities involved are small enough so that even special relativistic effects can be ignored. Thus, it is only necessary to carry out the calculations using an appropriate approximation to the full field equations.

To obtain a simplified form of the Einstein field equations that is suitable for experimental work, the weak field approximation will be used (see Weber, p. 87ff). This approximation uses the assumption that the gravitational potential energy in the gravitational fields involved in an experiment is small compared to the kinetic energy and the rest energy of the masses and nongravitational fields used in the experiment. This assumption is satisfied to a very high degree of approximation by all conceivable experimental situations.

If the gravitational fields are weak, then the metric tensor can be approximated by $$g_{\alpha\beta} \approx \delta_{\alpha\beta} + h_{\alpha\beta} \quad (9)$$

where $\delta_{\alpha\beta}$ is the flat space metric given previously and the $h_{\alpha\beta}$ are the perturbations of the metric introduced by the masses generating the gravitational fields. If the tensor gravitational potential is now defined as a certain combination of the perturbations $h_{\alpha\beta}$ on the flat space metric tensor $$\phi_{\alpha\beta} = h_{\alpha\beta} - \tfrac{1}{2} \delta_{\alpha\beta} h \quad (10)$$

and the necessary substitutions are made, we find that the nonlinear Einstein field equations become linear Poisson equations, or the weak field equations $$\Box \phi_{\alpha\beta} = \Delta \phi_{\alpha\beta} - \frac{1}{c^2} \frac{\partial^2}{\partial t^2} \phi_{\alpha\beta} = -\frac{16\pi G}{c^4} T_{\alpha\beta} \quad (11)$$

where $\Box$ is the d'Alembertian operator.

In the field equations, the stress-energy-momentum tensor is the means of coupling to the gravitational field. The various components of the stress-energy-momentum tensor are related to the density and momentum of the mass-energy involved in the devices of the invention.

The stress-energy-momentum tensor is known for a number of different sources.

The stress-energy-momentum tensor for physical matter is $$T_{\alpha\beta} = \mu c^2 U_\alpha U_\alpha + S_{\alpha\beta} \quad (17)$$

where $\mu$ is the density of the matter, $S_{\alpha\beta}$ is the elastic stress tensor of the material and $U_\alpha$ is the four-velocity defined by $$U^\alpha \equiv \frac{1}{c}\frac{dx^\alpha}{d\tau} = \frac{dt}{d\tau}\left(1, \frac{v^a}{c}\right) \quad (18)$$

where $v^a$ is the physical velocity. Thus, mechanical stresses can couple to gravitational fields through their contribution to the stress-energy-momentum tensor. If the energy and momentum in the stress or pressure fields can be neglected in comparison to the rest mass energy and momentum of the masses involved, then the stress-energy-momentum tensor has the simplified form $$T^{\alpha\beta} = \mu c^2 U^\alpha U^\beta \quad (20)$$

so that oscillating masses can couple to dynamic gravitational fields through their contribution to the stress-energy-momentum tensor. Because gravitational experiments nearly always involve the use of physical masses with their large amounts of concentrated energy density, it is this final form of the stress-energy-momentum tensor that is usually used for calculations. However, under certain conditions and especially for high frequency operation, the mechanical stress contributions become as important as the mass motion contribution.

The simplest approximation to the weak field equations assumes that the only sources of gravitational effects are physical masses and that the masses involved, not only have weak gravitational fields, but they also have low rotational rates or velocities compared with the speed of light. In this approximation, the only component of the stress-energy-momentum tensor (20) that is not negligible is $$T_{oo} = \mu c^2 \quad (21)$$

Since the velocities are assumed to be low, the time derivatives of the gravitational potential are smaller than the spatial gradients of the potential so the weak field equations (11) reduce to $$\Delta \phi_{oo} = -[(16\pi G)/c^2]\mu \quad (22)$$

The equation for the time-like component of the tensor gravitational potential (22) is a three dimensional Poisson equation which has the solution $$\phi_{00} = \frac{4G}{c^2}\int_v \frac{\mu}{r} dV \quad (23)$$

This component of the tensor gravitational potential is easily seen to be directly related to the scalar potential used in the Newtonian theory of gravitation $$\chi = -\frac{c^2\phi_{00}}{4} = -G\int_v \frac{\mu}{r}dV \approx -\frac{GM}{r} \quad (24)$$

so that, as expected, the Einstein gravitational field equations reduce to the Newtonian gravitational field equation in the lowest approximation.

Normally, the interaction of the Newtonian gravitational field with a detecting mass is considered as a purely static one, but if the position of the source mass (or the detecting mass) changes, then the gravitational field will vary with time and the interaction becomes a dynamic one.

Besides the dynamic Newtonian interaction, there is also another dynamic interaction governed by the Einstein law of gravity. This is gravitational radiation. The behavior of such radiation in any physically realizable experiment is governed by the weak field approximation to the field equations, for as it stands, the weak field approximation is a wave equation for the tensor gravitational potential $\phi^{\alpha\beta}$. The velocity of propagation is the same as the velocity of light.

The solution of the weak field wave equations with a nonvanishing source term is well known as:

$$\phi_{\alpha\beta} = \frac{4G}{c^4}\int_{v'} \frac{T_{\alpha\beta}(r, r', t - R/c)}{R} dV' \quad (25)$$

$$d^2 x^\mu$$

where $r$ is the field point, $r'$ is the source point and $R = r - r'$ is the distance from the source point to the field point.

The straightforward method of finding the solutions to these equations is to calculate the kinetic and stress energy in the source and use these directly. However, because of the laws of conservation of energy and momentum the various components of the stress-energy-momentum tensor are not independent and it is possible to convert the integrals over the stresses into integrals over the more easily identified motional energy of the sources. When we do this, we see that the spatial components of the tensor gravitational potential depend upon the second time derivatives of the mass quadrupole moment of the source $$\phi^{ab} = \frac{2G}{c^4 R}\frac{\partial^2}{\partial t^2}\int_{v'} \mu x^a x^b dV' \quad (26)$$

This equation shows that the lowest mode of gravitational radiation possible is quadrupole radiation. Thus, in general, any accelerated (i.e., rotating or vibrating) mass quadrupole will emit gravitational radiation.

The fact that gravitational radiation is quadrupole can also be understood in terms of the law of conservation of momentum. In any system of particles, the momentum of these particles must be conserved.

$$m_1\dot{x}_1 + m_2\dot{x}_2 + \ldots = 0 \quad (27)$$

But the gravitational radiation that is possible from these masses must come from the acceleration of the masses and if the equation for the conservation of momentum is differentiated, then $$m_1\ddot{x}_1 + m_2\ddot{x}_2 + \ldots = 0 \quad (28)$$

so that the gravitational radiation from each part of the source is cancelled (to first order) by the gravitational radiation from some other part of the source. Thus, there is no dipole gravitational radiation, only quadrupole or higher multipole radiation.

The simplest quadrupole mass source for the calculation of gravitational radiation energy emission is two equal masses rotating about their center of mass.

An example of such a rotating source would be a binary star system. Because the binary system is held together by gravitational forces rather than mechanical forces, it can emit copious amounts of gravitational radiation and this radiation can be detected by the devices of the invention.

Gravitational radiation can be thought of either as a propagating gravitational field or the propagation of the curvature of space-time. This radiation, be it space curvature or gravitational field, will exert forces on objects with mass. Since gravitational radiation and all dynamic gravitational interactions are of quadrupole nature because of the conservation of momentum, it is necessary to use at least a mass quadrupole to interact with the radiation in order to detect its existence.

A mass quadrupole, by its very nature, involves a length. It is not defined at a point but exists over a region about some point in space-time. Since the masses or mass density making up the quadrupole must be at different points in space-time, they each follow their own separate equation of motion along their own world line. Then, if there are any gradients in the gravitational field or space curvature due to gravitational radiation, the paths of the two parts of the mass quadrupole will differ slightly, indicating the presence of the radiation.

Conceivably, the two particles necessary for the mass quadrupole could be in free fall (connected only by their gravitational attraction), then the passage of gravitational radiation would cause relative motion between the two particles. But then there are difficulties as to whether the particles would be able to extract energy from the radiation or whether they would just return to rest after the passage of the radiation.

If, however, the two parts of the mass quadrupole are coupled with an energy converting mechanism that transforms the stress energy introduced by the gravitational radiation into some other form of energy such as acoustic vibrations or thermal energy, then the energy, once converted by these irreversible processes, cannot be completely reconverted again into gravitational energy. Thus, the radiation can be detected by extracting some of the energy out of the wave using a mass quadrupole and an energy conversion mechanism.

There still might be some doubt as to whether the stresses due to the gravitational radiation are real and can exert strains in a material body. For example, the special relativistic contraction due to high relative motion is not a physical effect that can be sensed by the rapidly moving object, and it might be argued that because of the principle of equivalence between gravitational fields and coordinate systems a similar effect would happen with gravitational radiation. However, the principle of equivalence is only valid at a point, and a mass quadrupole does not operate over a point, so that although the acceleration of the center of mass of the mass quadrupole cannot be observed, the gradient of the acceleration can be observed by the relative acceleration of the two masses of the mass quadrupole. The reality of the tides is an excellent example: they are purely gravitational in nature, but the coordinate system that nature chooses to use for the motion of the earth has only found a way to remove the center of mass forces and has not found a way to compensate for the dynamic gradient forces; they are real and energy can and is being extracted from them.

If a mass quadrupole is used for the detection of gravitational radiation, then there is present two particles, each with its own equation of motion, and coupled together by their mutual nongravitational forces. The behavior of such a system is described by the equation of differential motion (see Weber, p. 124ff)

$$\frac{D^2 n^\delta}{Ds^2} + R^\delta_{\alpha\beta\gamma} U^\alpha U^\gamma n^\beta = \frac{D}{Du_r} \frac{F^\delta}{nc^2} dw = \frac{f^\delta}{mc^2} \quad (33)$$

where $U^\alpha$ is the four velocity, $F^\delta$ is the nongravitational forces coupling the two parts of the mass quadrupole and $D/Ds$ is the covarient derivative with respect to the "time" $s$, $n^\beta$ is the "spatial" displacement of the mass points, $f^\delta$ is the force difference due to the "spatial" gradient of the force $DF^\delta/Dw$ operating across the differential "distance" $dw$, and $$R^\delta_{\alpha\beta\gamma}$$

is the Riemann curvature tensor.

Figure 6:
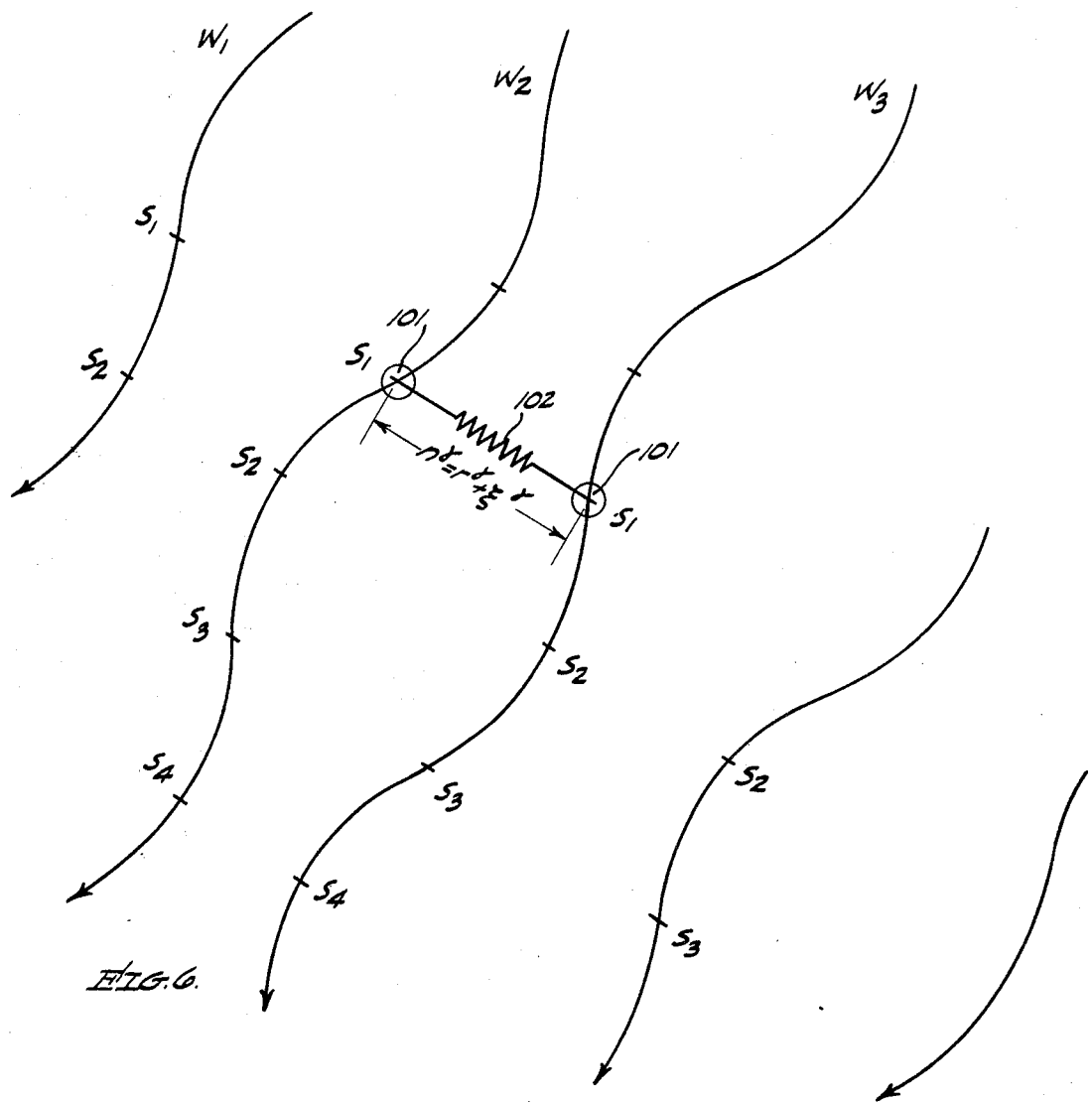
FIG. 6 illustrates schematically the interaction of a mass quadrupole with gravitational radiation.

The use of this equation may be examined for the very simple mass quadrupole detector consisting of two masses, each of mass $m$ and a spring (see FIG. 6). The two world lines $s$ of interest are those through the centers of two identical masses 101 and the distance $n^\delta$ between the two world lines consists of the initial length $r^\gamma$ of a spring 102 which does not vary with "time" and a small time varying extension $\xi$ $$n^\gamma = r^\gamma + \xi^\gamma \quad (34)$$

The nongravitational forces connecting the two masses 101 consists of a restoring spring force $$k^\alpha_\beta$$

plus dissipation $$d^\alpha_\beta$$

due to the motion of the spring 102.

$$-f^\gamma = k^\gamma_\alpha \xi^\alpha + cd^\gamma_\alpha \frac{D\xi^\alpha}{Ds} \quad (35)$$

In the limit of small, nonrelativistic vibrations of a freely falling detector, the equation of differential motion becomes:

$$\frac{d^2\xi^\alpha}{dt^2} + \frac{1}{m}d^\alpha_\beta \frac{d\xi^\beta}{dt} + k^\alpha_\beta \frac{\xi^\beta}{m} = -c^2 R^\alpha_{0\beta 0} r^\beta \quad (36)$$

This is the equation for a damped harmonic oscillator driven by certain components of the Riemann tensor. Thus, by measurement of the displacement amplitude of a mechanical oscillator such as those of the present invention, the time varying space curvature induced by gravitational radiation can be calculated.

The previous description of the operation of the devices of the present invention in terms of the Einstein theory of gravity is informative and important in terms of the utilization of the devices in communication by gravitational radiation since only the Einstein theory can adequately discuss the radiation aspects of gravitation. However, for a detailed quantitative discussion of the operation of the devices of the invention, it is only necessary to assume a very simplified model that is completely describable by the Newton law of gravity.

Figure 7:
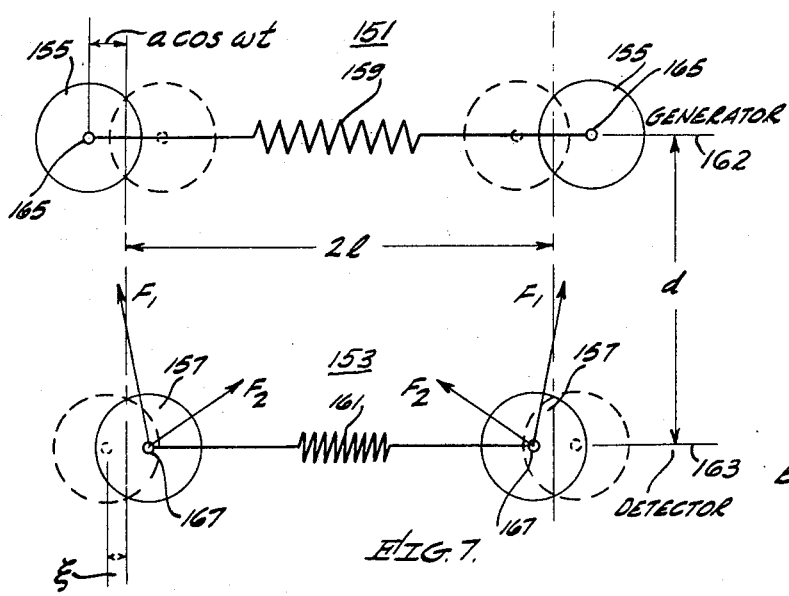
FIG. 7 is a schematic diagram of the coupling of two mass quadrupoles by dynamic gravitational fields.

The dynamic gravitational interaction of two oscillating mass quadrupoles may be investigated and are shown in FIG. 7. Each mass quadrupole 151, 153 consists of two masses 155 and 157 having a mass of m connected by spring 159 and 161, respectively, of nominal length $2l$, spring constant $k$, and damping constant $D$ constrained to move only along the axis 162 and 163 through the two mass centers 165, 167. If it is assumed that the two mass quadrupoles 151, 153 are lying parallel to each other, with separation d and one (the generator) is being driven by an energy source (not shown) so that the masses 155, for example, are undergoing a periodic displacement $a \cos \omega t$, then the gravitational field of the generator will contain periodic variations. These periodic variations of the gravitational field will cause periodic forces $F_1$ and $F_2$ to be exerted on the two masses 157 of the second mass quadrupole (the detector) and will cause it to respond with a periodic motion with relative amplitude $\xi$.

If Newton's law of reaction ($F = ma$) is used for the masses, then the differential acceleration of the two masses 157 of the detector caused by the differential forces of the masses 155 is given by $$\frac{Gmma \cos wt}{(d^2 + a^2 \cos^2 wt)^{3/2}} - \frac{Gmm(2l + a \cos wt)}{[d^2 + (2l + a \cos wt)^2]^{3/2}}$$

$$- k\xi - D\dot\xi = m\ddot\xi \quad (37)$$

Where the first term is due to the differential forces caused by the coupling $F_1$ of the detector masses 157 to the nearest generator masses 155 and the second term is due to the differential forces caused by the coupling $F_2$ between the detector masses 157 and the furthest generator masses 155 (neglecting self interactions).

If $l > d >> \xi$ is assumed, then after simplification there is obtained an equation $$\ddot\xi + \frac{k}{m}\xi + \frac{D}{m}\dot\xi = \frac{-2Gml}{(d^2 + 4l^2)^{3/2}}$$

$$+ \frac{Gma}{d^3} \cos wt + \ldots \quad (38)$$

If the mass $m$ and spring constant $k$ are chosen so that the detector mass quadrupole 153 is resonant at the frequency $\omega$ of the generator 151, and if the damping constant is expressed in terms of the frequency $\omega$ and energy storage factor $Q$, then the equation for the detector becomes $$\ddot\xi + \omega^2 \xi - (\omega/Q)\dot\xi = (Gma)/(2d^3) \cos \omega t \quad (39)$$

where only the gravitational force gradient term that has a frequency component at the frequency of resonance of the detector has been kept.

This is an equation for a damped harmonic oscillator and it has the solution $$\epsilon = \frac{\xi}{l} = -\frac{GmQ}{2\omega^2 l} \frac{a}{d^3} \sin \omega t \quad (40)$$

where $\epsilon$ is the strain or displacement per unit length $l$ of the detector due to the oscillation of amplitude $a$ and frequency $\omega$ of the generator a distance $d$ away.

To obtain a quantitative estimate of the coupling to be expected from a practical physical embodiment of this simplified model, the following assumptions are made.

$m = 10$ kg
$Q = 10^6$ (easily obtainable in mechanical systems)
$a/l = 10^{-3}$ (easily obtainable for transverse vibrations)
$\omega = 2\pi \times 160$ cps $= 10^3$
$d = 1$ foot.

With these experimental parameters, the strain predicted by the Newtonian laws of force and gravitation is $$\epsilon = 10^{-11}$$

There exist commercially, barium titanate dynamic strain transducers which have a voltage-strain characteristic of $1.6 \times 10^5$ volts per unit strain. The voltage output of such a transducer coupled to a strain of $10^{-11}$ in the mass quadrupole detector is 1.6 microvolts. This is a voltage that is easily measured by standard voltage measurement devices.

The above discussion shows that signals can be transmitted between two mass quandrupoles by dynamic gravitational interactions and demonstrates that the devices of the invention couple to the dynamic gravitational fields in a practical and usable manner, which is completely describable in terms of the well-verified Newtonian laws of gravity as well as the Einstein theory of gravity, and shows that the observed coupling is due to dynamic gravitational interactions and not due to acoustic coupling or other extraneous factors.

With reference to FIG. 8, there is shown a further embodiment of a body of elastic material with distributed mass including a mass quadrupole taking the form of a relatively long thin aluminum bar 201 having a nodal line 203 located at the center of the bar 201. This embodiment deals with transverse vibrations of the bar 201. The bar 201 may be supported at the nodal line 203 by a wire (not shown). Strain transducers, such as piezoelectric transducers 205, may be attached at the nodal line 203 or at convenient points adjacent to this line such as shown in FIG. 8. The transducers 205 are connected to the remainder of the circuit by wires 17 in the same manner as that shown in FIG. 1.

In contrast to the embodiment of the invention as shown in FIG. 1 and 2 where tensions induced by dynamic gravitational force gradients are sensed, this embodiment is sensitive to torques induced by such force gradient fields. It should be noted that quartz may be substituted for the aluminum making up the bar 201 (or cylinder 11) which will provide an even higher $Q$.

In order to reduce the physical dimensions of the sensing element such as the bar 201 and still obtain a vibrational mode having a relatively long vibrational period to facilitate the measurement of low frequency gravitational force gradients, the mass of sensing element may be concentrated at points closer to each other than would be possible with an elongated bar of constant cross section with the same total mass. This embodiment is shown in FIG. 9 where a sensing element 251 comprises a relatively short bar portion 253 and concentrated mass portions 255 at the ends of the bar portion 253. The element 251 has a nodal line 257 at the center of the bar portion 253 where the element 251 may be supported in the same manner as shown in FIGS. 1, 2 and 5. This embodiment, like the one shown in FIG. 8, is sensitive to torques induced by dynamic gravitational force gradient fields.

With reference to FIG. 10, there is shown an X configuration sensing element 301 that provides an embodiment which has better dynamic balance characteristics since it interacts less with the supporting structure. Here, the sensing element 301 comprises, in effect, two orthogonally disposed bar sections 303 and 305, respectively, joined at their centers 307 where the line of intersection is along the width of the bars 303 and 305. However, in order to assure cooperative interaction between the bars 303 and 305, it is advisable to provide fillet sections 311 where the bars 303 and 305 are joined. To sense torques in the plane of the sensing element 301 produced by dynamic gravitational force gradient fields, electromechanical strain transducers 313 are attached by conventional adhesive techniques to each side of the bars 303 and 305 adjacent the fillet sections 311. The nodal lines for the two orthogonal bar sections coincide at their centers 307, where ideally, the transducers 313 should be placed. But, in the practical embodiment, these transducers may be placed as close to the nodal lines as is possible.

FIG. 11 illustrates an embodiment which is sensitive to torques normal to the plane of the sensing element. From this figure, it can be seen that the sensing element 401 is similar in many respects to the element 301 in FIG. 10 except that bar sections 403 and 405 are joined orthogonally at their centers 407 where the line of intersection is along the thickness of the bars 403 and 405. Here, transducers 413 are attached to each bar on each side of the center line 407 and are connected to the remainder of the detector circuitry as shown in FIG. 1.

From the foregoing, it will be seen that there is described a dynamic gravitational force gradient field detector which may be advantageously used, for example, as an instrument for the detection of geological formations, and when using certain described sensing elements, may be small enough to be transported in a moving platform such as an airplane for large ore geological surveying.

Although several specific embodiments have been herein illustrated, it will be appreciated that other organizations of the specific arrangements shown may be made within the spirit and scope of the invention. Additionally, other components or elements may be substituted for those which have been particularly named. For example, the sensing element for the detector can have a torsional vibrational resonant mode and/or a shear vibrational resonant mode which would be excited by the torques due to the dynamic gravitational force gradients. Furthermore, since every elastic body has a multitude of mechanical vibrational resonant modes, each having a characteristic frequency, then each mode can be coupled into a separate electrical circuit having a corresponding resonant frequency to provide more information on the frequency spectrum of the dynamic gravitational force gradient field exciting the sensing element. Yet another possibility is to place a number n of the described detectors in a region whose linear dimensions are less than half a gravitational wavelength. The electrical outputs of the n number of detectors may then be combined together in a coherent manner to provide a capture cross section which is proportional to the $n^2$ rather than $n$. Finally, it should be clearly understood that the embodiments of the invention described in the specification will function advantageously without the elaborate means described herein to reduce the noise factor but, of course, with reduced sensitivity.

Accordingly, it is intended that the foregoing disclosure and the drawings shall be considered only as illustrations of the principles of this invention and are not to be construed in a limiting sense.

What is claimed is:

1. A detector of dynamic gravitational force gradient fields, comprising: a body of elastic material with distributed mass including a dynamic mass quadrupole moment responsive to a dynamic gravitational force gradient having a characteristic frequency, said response taking the form of relative acceleration between portions of said distributed mass, said body having a relatively high $Q$ mechanical vibrational resonant mode excited by said relative acceleration; and electrical output means coupled with said vibrational resonant mode in said body of elastic material to form a relatively high $Q$ electromechanical circuit which is resonant at said characteristic frequency for providing an output signal indicative of the magnitude and phase of said dynamic gravitational force gradient.

2. A detector of dynamic gravitational force gradient fields, comprising: a body of elastic material with distributed mass including a dynamic mass quadrupole moment responsive to a dynamic gravitational force gradient having a characteristic frequency, said response taking the form of relative acceleration between portions of said distributed mass, said body having a mechanical vibrational resonant mode excited by said relative acceleration; and electrical output means coupled to said body of elastic material to form an electromechanical circuit which is resonant at said characteristic frequency for providing an output signal.

3. A detector of dynamic gravitational force gradient fields, comprising: a body of elastic material with distributed mass including a dynamic mass quadrupole moment responsive to a dynamic gravitational force gradient having a characteristic frequency, said response taking the form of relative acceleration between portions of said distributed mass, said body having a mechanical longitudinal vibrational resonant mode excited by said relative acceleration; and electrical output means coupled to said body of elastic material to form an electromechanical circuit which is resonant at said characteristic frequency for providing an output signal.

4. A detector of dynamic gravitational force gradient fields, comprising: a body of elastic material with distributed mass including a dynamic mass quadrupole moment responsive to a dynamic gravitational force gradient having a characteristic frequency, said response taking the form of relative acceleration between portions of said distributed mass, said body of elastic material having a longitudinal mechanical vibrational resonant mode excited by said relative acceleration; and electrical output means including electromechanical transducers coupled to said body of elastic material to form a relatively high $Q$ electromechanical circuit which is resonant at the characteristic frequency of said dynamic gravitational force gradient for providing an output signal.

5. A detector of dynamic gravitational force gradient fields, comprising: a body of elastic material with distributed mass including a dynamic mass quadrupole moment responsive to a dynamic gravitational force gradient having a characteristic frequency, said response taking the form of relative acceleration between portions of said distributed mass, said body of elastic material having a relatively high $Q$ mechanical vibrational resonant mode excited by said relative acceleration; and electrical output means including electromechanical transducers coupled to said body of elastic material to form a relatively high Q electromechanical circuit which is resonant at the characteristic frequency of said dynamic gravitational force gradient for providing an output signal.

* * * * *